United States Patent [19]

Glocker

[11] 4,248,539
[45] Feb. 3, 1981

[54] MATERIAL SPREADER

[76] Inventor: Edwin M. Glocker, 14697 Roxbury Rd., Glenelg, Md. 21737

[21] Appl. No.: 972,667

[22] Filed: Dec. 26, 1978

[51] Int. Cl.³ .............................................. B01F 5/06
[52] U.S. Cl. ..................................... 366/341; 222/459
[58] Field of Search ..................... 222/459; 366/9, 336, 366/341, 337

[56] References Cited

U.S. PATENT DOCUMENTS

| 892,399 | 7/1908 | Carlen | 366/9 |
| 1,385,254 | 7/1921 | Loft | 222/459 |

FOREIGN PATENT DOCUMENTS 726570  1/1966 Canada ......................................... 366/9

Primary Examiner—Robert J. Spar
Assistant Examiner—Frederick R. Handren
Attorney, Agent, or Firm—Armstrong, Nikaido, Marmelstein & Kubovcik

[57] ABSTRACT

A solids spreader in the form of a three-dimensional quincunx including a vertical column having a number of layers of parallel bars extending horizontally across it to deflect falling material with the bars in each layer being set at an angle to the bars in adjacent layers and being offset with respect to the bars in the next layer above and below in the same direction.

4 Claims, 5 Drawing Figures

MATERIAL SPREADER

BACKGROUND OF THE INVENTION

In filling large containers such as bins and transport hoppers with fluent solids, there is a tendency for the material to cone below the feed line. This is not a problem when the material is of uniform composition but when the material is a mixture of solids of different physical characteristics, coning gives rise to segregation in the material because the larger particles tend to move to the periphery of the cone while the smaller particles stay in the center. This result is not easily avoided in commercial operations where material is fed into bags or other containers from a filler pipe of smaller cross-section than that of the container being filled. The greater the difference between the relative sizes of the filler pipe and the container, the greater will be the tendency for material to segregate. When the material is a blend of different components of different particle sizes, shapes, densities and flow characteristics, segregation of the material can be a serious problem. This phenomenon is well recognized in the materials handling field and various methods and devices have been tried in an effort to overcome it.

DESCRIPTION OF THE PRIOR ART

One method of avoiding the undesirable effects of segregation of materials would be to move the feed line in a pattern over the entire area of the container being filled. This would result in slight coning but the overall effect might not be noticeable since the entire pile would comprise a large number of small cones. However, this would require complicated equipment both from the standpoint of construction and operation. From a cost standpoint, it would probable be beyond the reach of most bulk operations. Another method would be to expel the fluent solids at a horizontal angle into the space and to move the feed line in a horizontal plane, depending on the velocity of the material to carry it to the farthest reaches of the vessel. Unfortunately, this would not solve the problem because segregation would occur in the air instead of in the pile.

SUMMARY OF THE INVENTION

I have developed a device by which it is possible to spread material uniformly over a large area. My device is in the form of an upright column having rows of parallel bars extending across the column, each row being juxtaposed at an angle to the row immediately above or below and having the bars in alternate rows spaced so that they are vertically offset. I am able to obtain a layer of uniform thickness of material even when the material is fed into the device at a small area of the top. In its simplest form, my device is in the form of a plurality of three-dimensional quincunxes.

A quincunx is an arrangement of five objects, one at each corner of a square or rectangle and one at the center. The result of repeating the arrangement in three dimensions is an array in which the objects in one row are offset from the objects in the adjacent rows. Such an arrangement made with pins projecting from a vertical surface is used to illustrate the Gaussian or normal frequency distribution. The distribution forms below a quincunx when balls slightly smaller than the distance between the pins are dropped from a fixed position above and pass through the device. The arrangement brings each ball into contact with a pin in each horizontal row. At each contact, the ball has a chance to pass down either side of the pin. As a result, each ball follows a random path through the rows and a collection of a large number of balls conforms to the normal frequency distribution.

The present invention adds a third dimension by using rows of horizontal rods, half of which are parallel in one direction and the other half of which are parallel to each other but are at an angle to the first half. The purpose of the three-dimensional quincunx is to expand a small cross-section flow of material into a large cross-section flow. Sometimes, it is desirable to increase the cross-section of the flow to other devices. An example of such other devices is the gravity-flow mixer described in my co-pending application Ser. No. 972,668 filed Dec. 26, 1978, now U.S. Pat. No. 4,207,009. In that mixer, material is mixed by passage downward through a column having a number of stationary flights. It is desirable that material be fed to the mixer over the entire cross-sectional area of the device. The present spreader provides a simple means for accomplishing this purpose.

This device is also useful in preparing samples from a mix of materials in which the components may have undergone some segregation. By passing the sample through the spreader, the components are distributed uniformly over the entire area of the lower end of the device. Also, it is useful in distributing fluent materials into a much larger vessel where the inlet or feed line is relatively small in comparison with the area of the vessel.

DESCRIPTION OF THE PREFERRED EMBODIMENT

Figure 1:
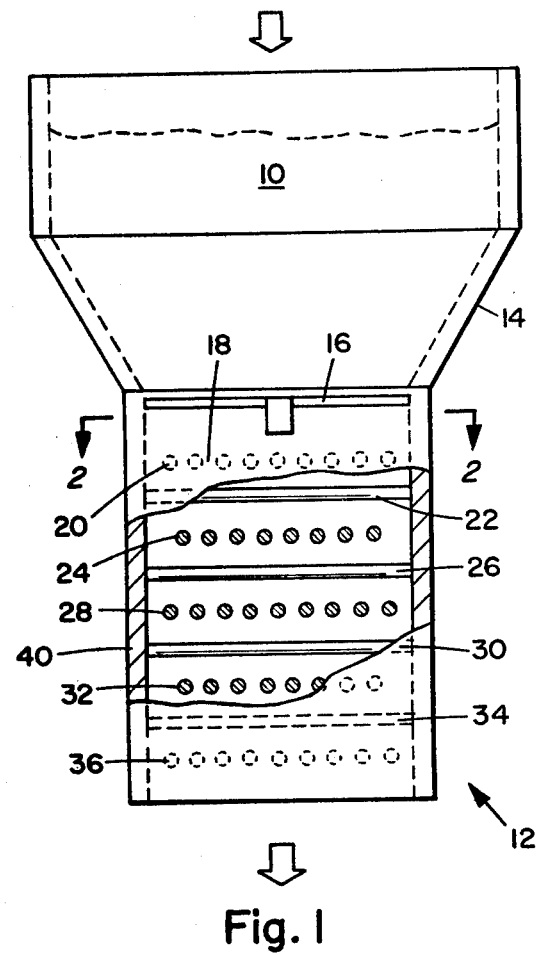
FIG. 1 is an elevation, partly in section, of a complete unit embodying the spreader of the present invention.
Figure 4:
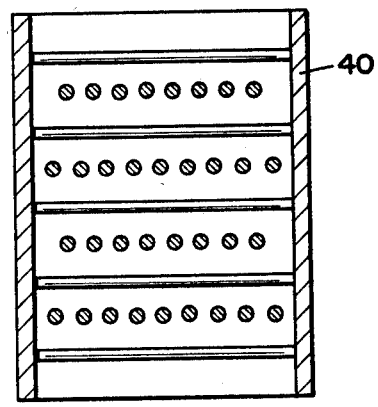
FIG. 4 is a vertical sectional view of FIG. 2 taken along line 4—4.

The present invention will be further explained with reference to the drawings and referring at first to FIG. 1, a dry fluent material, such as fertilizer solids is fed into the top of a vertically contained zone 12 by any appropriate means, here shown as a hopper 14, the outlet of which is controlled by gate 16. The material strikes a first series of parallel bars and is divided into a plurality of curtains which fall through the openings 20 between bars 18. On striking the bars, the material is given a horizontal vector which gives it an outward motion as well as its downward motion. Immediately below the first series of horizontal bars is a second series of bars 22 at a transverse angle to the bars of the first series. The bars 22 are spaced similarly to bars 18 and divide the curtains of material falling through openings 20 into a plurality of segments of material and, at the same time, impart a horizontal vector to the motion of the falling material transverse to the vector imparted by the first series. The segments of the material from adjacent curtains are thereby caused to combine and form a new curtain of material falling transversly to curtains from the first series. Immediately below the second series of bars 22 is a third series of bars 24 which divide the second curtains of material into further segments and cause the new segments of adjacent curtains to combine and form a third series of curtains.

In the apparatus shown, additional layers of parallel bars 26, 28, 30, 32, 34, and 36 are provided. There is no limit to the number of layers of bars that can be employed except a practical limit of expense. In most cases, five or six layers will give full effect and after that, little effect is realized unless the material is collected and returned to the central portion of the device or a similar device positioned below. Material falling through the lowest layer of bars may be collected in any convenient vessel (not shown). Material may fed into a shipping container, truck body or hopper or to a storage bin, silo or the like, depending on the use desired. It is to be understood that hopper 14 and collector 38 are optional features and are not a part of this invention.

By the numerous divisions, deflections, and recombinations, the material falling through the device undergoes a considerable degree of mixing as well as spreading. If the bottom of the device is entirely open, the material reaching the bottom will be distributed in a uniform layer.

Figure 2:
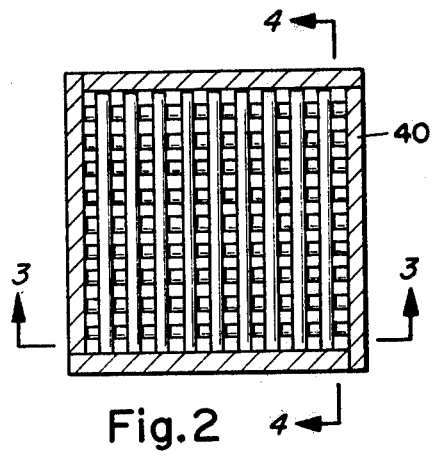
FIG. 2 is a plan view of FIG. 1 taken along the line 2—2.
Figure 3:
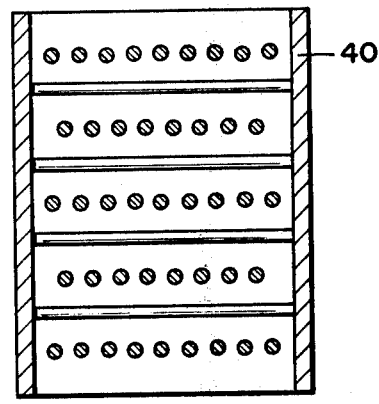
FIG. 3 is a vertical sectional view of FIG. 2 taken along the line 3—3.
Figure 5:
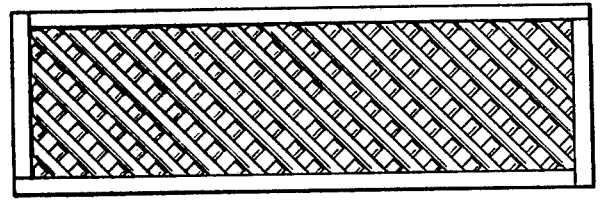
FIG. 5 is a plan view of another embodiment of the quincunx spreader.

Another embodiment of the invention shown in FIG. 5 represents a diagonal section of a device such as that shown in FIG. 2 but of oblong shape.

The present invention is useful in spreading materials being introduced into a container where coning would result in undesirable segregation. By use of the device of the present invention, a container such as a shipping bin or hopper can be filled uniformly. In this case, it may be desirable to have a spreader of cross-section substantially the same as that of the bin or hopper. Another use would be in filling bags through a tube or pipe. In such operations, the tube is not usually filled completely and material is allowed to fall through the last portion of the tube from a measuring or weighting hopper above. A device embodying the present invention interposed in the tube at its outlet will prevent coning and segregation of materials.

While I have shown my device as having a square or oblong cross-section, it may as well be round or of any other convenient shape. The circumstances of use may dictate a particular shape. Any of such shapes will be operative as long as the inventive concept of parallel bars in series and layers with proper spacing is maintained. It is necessary that the bars in any layer be spaced apart so that material will can fall between and it is necessary that the layers be far enough apart that bridging not occur. The exact spacing and number of layers of bars will depend on the flow characteristics of the material being passed through the apparatus.

Other uses and modifications will occur to those skilled in the art and such are entirely within the spirit of the present invention, the scope of which is defined by the appended claims.

I claim:

1. A device for uniformly spreading a fluent material comprising in combination a vertical column formed by solid enclosing side walls, said column having an open top and an open bottom and being of uniform cross-section from top to bottom, a plurality of stacked rows of spaced parallel bars extending across said column, the bars in each row being uniformly spaced across the entire cross-section of said column, a first set of said rows having the bars therein extending in a first direction, a second set of said rows having the bars therein extending in a second direction which is at an angle with respect to said first direction, the rows of said first set being positioned with respect to the rows of said second set so that the bars in each row are juxtaposed at an angle with respect to the bars in the rows immediately above and below, the bars in every other row of a given set being in the same vertical plane, the bars in intervening rows of said given set being laterally offset with respect to the bars in the rows of said given set immediately above and below, the spacing between bars in any given row and between the rows being sufficient to permit the flow of material through said device without bridging and from the open bottom.

2. The device of claim 1 wherein said angle is a right angle.

3. The device of claim 2 wherein the column is rectangular and the bars are disposed in the form of a three-dimensional quincunx.

4. The device of claim 3 wherein the column is square.

* * * * *

UNITED STATES PATENT AND TRADEMARK OFFICE
CERTIFICATE OF CORRECTION

PATENT NO. : 4,248,539

DATED : February 3, 1981

INVENTOR(S) : Edwin M. Glocker

It is certified that error appears in the above—identified patent and that said Letters Patent is hereby corrected as shown below:

Column 1, line 36, "probable" should read -- probably --.

Signed and Sealed this

Twenty-first Day of July 1981

[SEAL]

Attest:

GERALD J. MOSSINGHOFF

Attesting Officer

Commissioner of Patents and Trademarks